United States Patent [19]
Salmon

[11] Patent Number: 5,123,381
[45] Date of Patent: Jun. 23, 1992

[54] DISPOSABLE CAT LITTER BOX

[76] Inventor: Robert Salmon, 2 Venture La., Sun River, Oreg. 97707

[21] Appl. No.: 845,963

[22] Filed: Mar. 4, 1992

[51] Int. Cl.$^5$ .............................................. A01K 29/00
[52] U.S. Cl. ................................................... 119/165
[58] Field of Search ............... 119/161, 165, 167, 168, 119/169, 170; 229/114, 180, 101; 206/216, 223

[56] References Cited

U.S. PATENT DOCUMENTS

| | | | |
|---|---|---|---|
| 4,164,314 | 8/1979 | Edgar | 119/165 X |
| 4,441,451 | 4/1984 | Neal | 119/168 |
| 4,501,226 | 2/1985 | Bienvenu et al. | 119/168 |
| 4,548,160 | 10/1985 | Feitelson | 119/168 |
| 4,846,105 | 7/1989 | Caldwell | 119/168 |

Primary Examiner—Gene Mancene
Assistant Examiner—Thomas Price
Attorney, Agent, or Firm—John F. Ingman

[57] ABSTRACT

A disposable cat litter box, preferably made of a single sheet of corrugated cardboard treated to prevent leakage of moisture, is formed so that when a closed box is opened for use, the top is unfolded to the vertical on all sides to provide both end extensions and side extensions. The end extensions include end flaps which extend inward from their side edges, and tabs which have a pre-cut periphery except for an uncut side and are located proximate the end flaps. The side extensions fold downwards upon themselves, at pre-formed longitudinal midlines, about the inwardly extending end flaps of the end extensions, the end flaps providing support for the side extensions. With the side extensions tightly folded downwards, the tabs on the end extensions are rotated inward about their uncut side, wherein subsequent release of the side extensions allows the side extensions and inwardly rotated tabs to resiliently engage, preventing further unfolding of the side extensions, and thus restraining the side extensions in an upright position. The end extensions are locked into their upright position by the embrasure of the side extensions about the end flaps of the end extensions. The interconnection of the side and end extensions establishes a continuous rigid wall about the box. For disposal, the tabs are merely rotated to their original flush positions within the end extensions, thus releasing the side extensions and end extensions for refolding to their original horizontal positions as the top of the box.

7 Claims, 3 Drawing Sheets

DISPOSABLE CAT LITTER BOX

BACKGROUND OF THE INVENTION

1. Field of the Invention

The invention generally relates to litter boxes for cats and more particularly is concerned with a disposable litter box which may be prepackaged with litter and discarded as a unit after use.

2. Description of the Prior Art

Cat litter boxes generally are nondisposable, shallow, open containers, made of plastic or metal, into which several inches of litter material have been placed. When the conventional nondisposable cat litter box has been used sufficiently to become objectionable, the owner or caretaker of the cat is faced with the unpleasant task of emptying the contents of the litter box, cleaning the box itself, and refilling it with litter, usually by pouring from a large sack. The maintenance of a conventional cat litter box is an objectionable task, to be avoided if possible.

Disposable containers have been previously designed, but have not gained general popularity because of cost, and complexity in preparation for use and disposal. Some disposable boxes include slots to open and tabs to fit therein. If tabs are of the non-locking variety, they are liable to come loose in use; if locking tabs are used, they may be difficult to insert and defy unlocking when attempting to dispose of a box with used and objectionable litter.

There exists a need for a disposable cat litter box which:

- is capable of serving as an effective package or container for the marketing of cat litter, to include both display and shipping;
- can be prepared for use by the cat owner or caretaker with little effort;
- is structurally strong and reliable; and
- can be quickly and easily prepared for sanitary disposal while containing used cat litter.

SUMMARY OF THE INVENTION

The present invention provides a disposable cat litter box which is designed to satisfy the aforementioned needs. The invention embodies a box for cat litter which is compact and sturdy, has upwardly extending, interconnecting sides for retaining the cat litter, and is simple to assemble for use and disassemble for disposal.

Accordingly, the present invention includes a moisture resistant box which, in closed pre-use form, may include cat litter. The box preferably is formed of corrugated cardboard which has been treated to prevent leakage of cat urine when in use. The box is formed of a single flat piece, so as to, when assembled, have angled sides to both reduce the amount of cat litter required and to avoid concentration of waste at the bottom edges thereof. When the relatively flat closed box is opened for use, the top is unfolded to the vertical on all sides to provide both end extensions and side extensions which, when interlocked, present a barrier to retain cat litter while the box is in use. The end extensions have end flaps which extend inward from their side edges, and tabs which are located proximate the end flaps. Each tab is pre-cut about its periphery except for a side located more distant from the side edge of the end extension. The side extensions fold downwards upon themselves, at pre-formed longitudinal midlines, about the inwardly extending end flaps of the end extensions, the end flaps providing support for the side extensions. Finally, with the side extensions tightly folded, the tabs on the end extensions are rotated inward about the uncut tab side, so as to be located adjacent to the downwardly folded side extensions. Subsequent release of the side extensions allows the side extensions to engage against the inwardly rotated tabs, preventing further unfolding of the side extensions, and thus restraining the side extensions in an upright position. The end extensions are concurrently locked into their upright position by the embrasure of the side extensions about the end flaps of the end extensions. The interconnection of the side and end extensions establishes a continuous rigid wall about the box.

Upon need for disposal of the cat litter, the tabs are merely rotated past the side extensions to their original flush positions within the end extensions, thus releasing the side extensions. The end extensions and side extensions are then refolded to their original horizontal positions to resume their function as the top of the disposable cat litter box, allowing the closed box, with litter, to be easily disposed of.

DESCRIPTION OF THE PREFERRED EMBODIMENT

Figure 1:
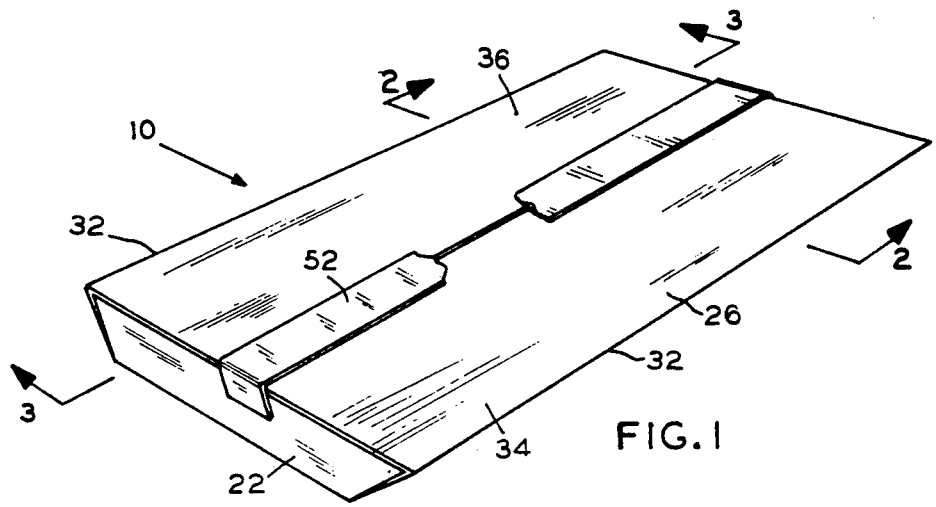
FIG. 1 illustrates a perspective view of the disposable litter box as closed for shipment, marketing, or storage.
Figure 2:
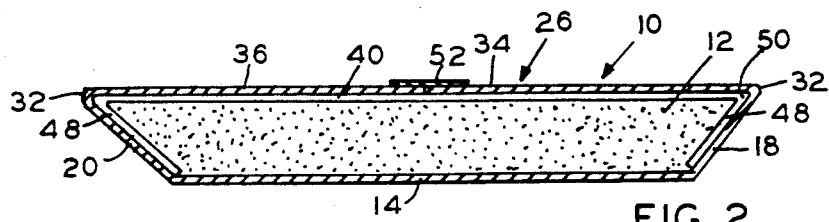
FIG. 2 illustrates a sectional view of a closed disposable cat litter box containing litter, as seen at line 2—2 of FIG. 1.
Figure 3:
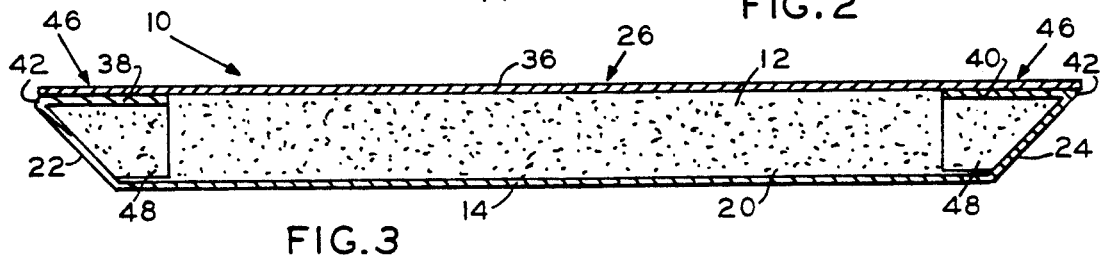
FIG. 3 illustrates a sectional view of a closed disposable cat litter box, as seen at line 3—3 of FIG. 1.
Figure 10:
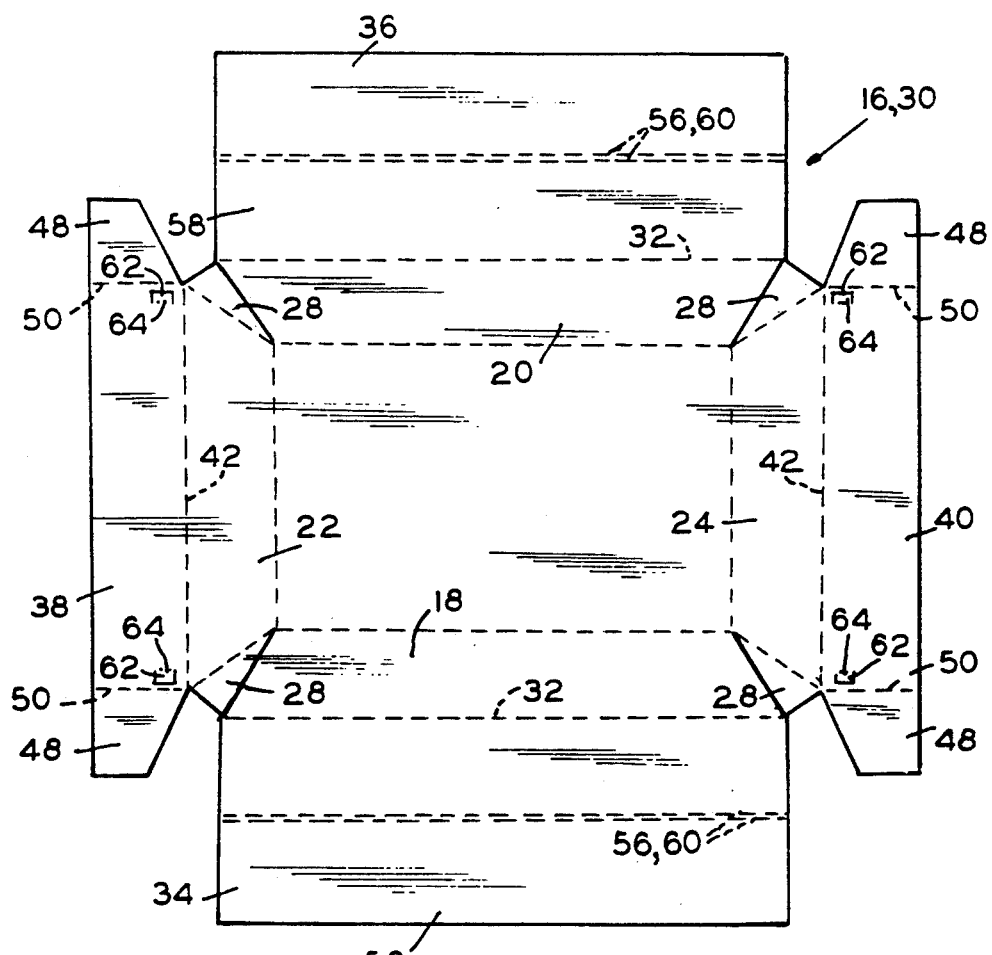
FIG. 10 illustrates a single flat sheet of cardboard which is cut in a shape to form the disposable cat litter box, the dashed lines being folding lines.

Referring now to the drawings, there is shown the preferred embodiment of the disposable cat litter box 10. The box 10 may be marketed with cat litter 12 enclosed therein, providing instant availability without further handling. The box 10, when closed, includes a rectangular-shaped base 14, two opposing side walls 18, 20, two opposing end walls 22, 24 and a top 26. The side walls 18, 20 and the end walls 22, 24 preferably are slanted, extending upwards and outwards at approximately a 45-degree angle. The box 10 may be formed from a single sheet 30 of corrugated cardboard 16 which is moisture resistant, such as obtained by waxing, at least for the base 14, side walls 18, 20 and end walls 22, 24. The side walls 18, 20 and end walls 22, 24 are mutually joined, such as by glued tabs 28 which extend from the end walls 22, 24, as best seen at FIG. 10 which illustrates the flat single sheet 30 form of the box 10. Joined in folding relationship at 32 to the side walls 18, 20, respectively, are side extensions 34, 36 which, when folded horizontally inward, form the top 26 of the box 10. Likewise, end extensions 38, 40 are attached In folding relationship at 42 to the end walls 22, 24, respectively. Each end extension 38, 40 has formed, at its side edges 44, a flap 48 folding inwardly at 50. With the box 10 in the closed position, as in FIGS. 1 through 3, the end extensions 38, 40 are folded horizontally inward as seen at 46, beneath the side extensions 34, 36, with the flaps 48 extending downward and inward to lie adjacent to the side walls 18, 20.

Figure 4:
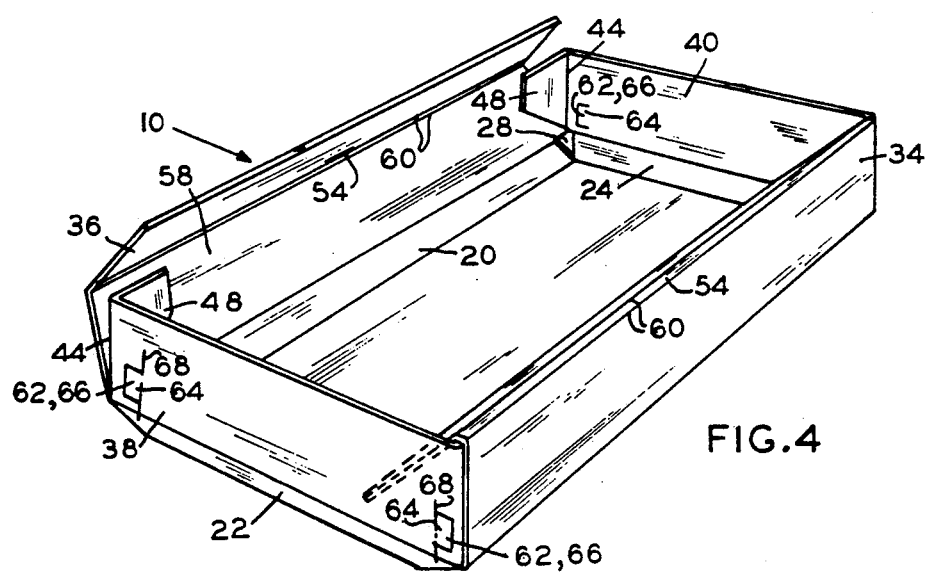
FIG. 4 illustrates a perspective view of a partially unfolded disposable cat litter box.
Figure 5:
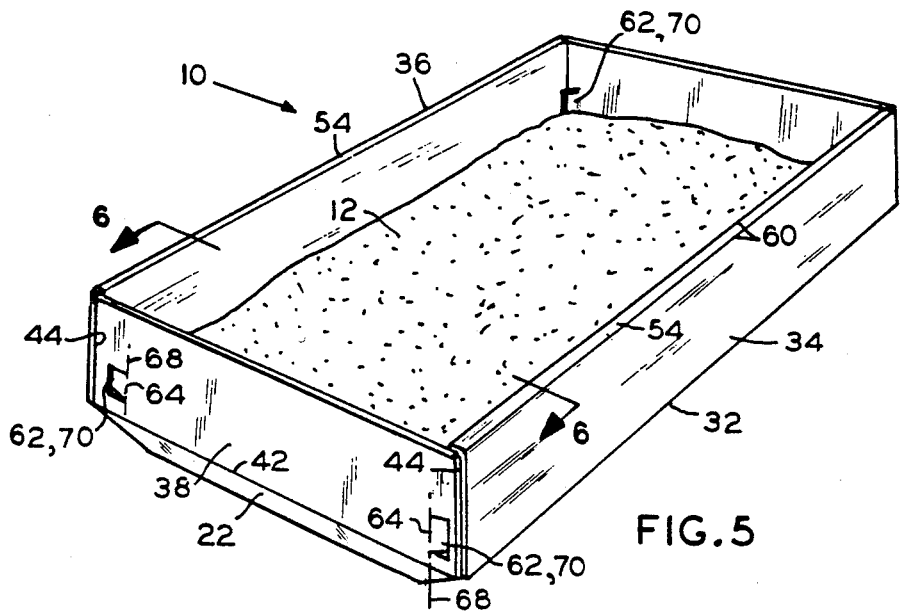
FIG. 5 illustrates a perspective view of an open disposable cat litter box with side and end extensions locked for use.
Figure 6:
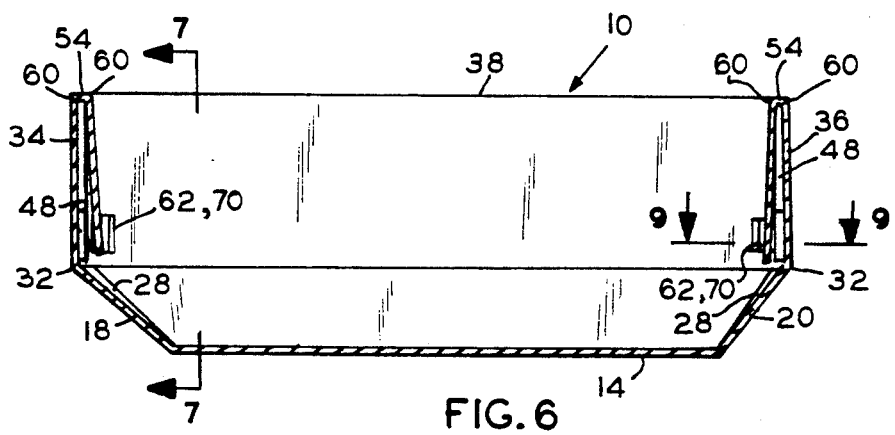
FIG. 6 illustrates a sectional view of the disposable cat litter box as seen at line 6—6 of FIG. 5.
Figure 7:
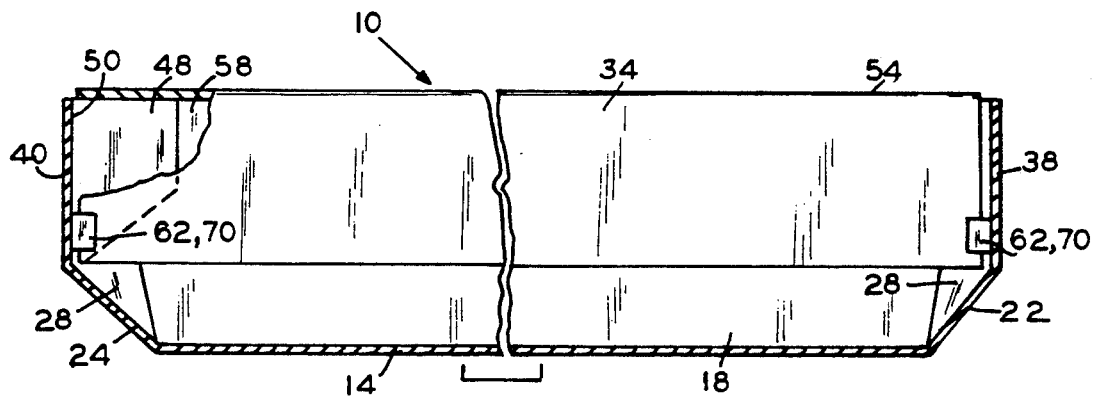
FIG. 7 illustrates a partially broken away sectional view of the disposable cat litter box as seen at line 7—7 of FIG. 6.
Figure 8:
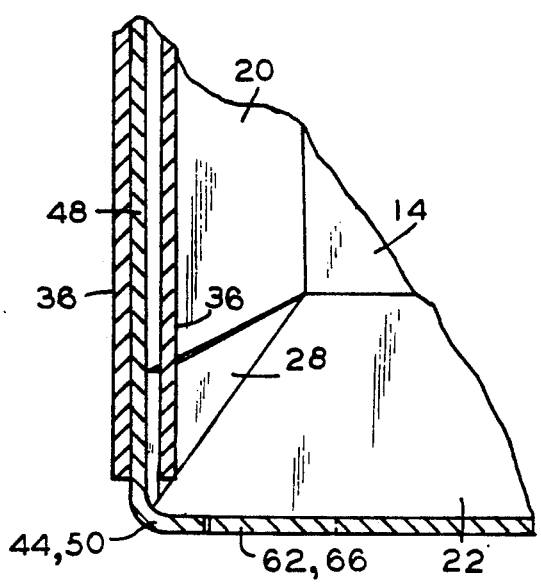
FIG. 8 illustrates a sectional view of the relationship between the side extension and end extension prior to inward rotation of the tab.
Figure 9:
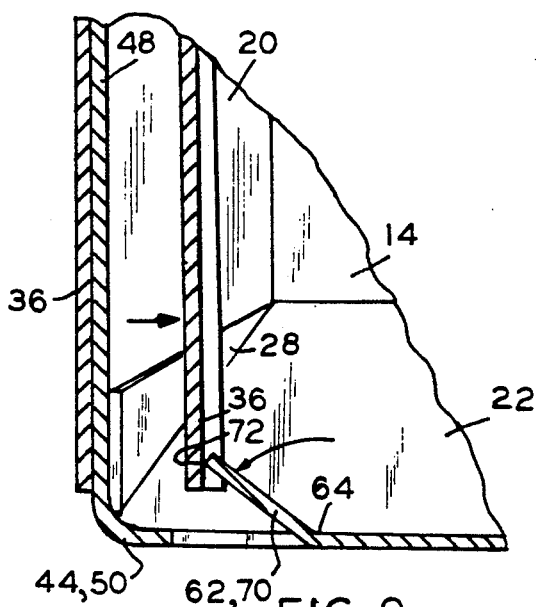
FIG. 9 illustrates a sectional view of the engagement of the inwardly rotated tab of the end extension with the side extension, as seen at line 9—9 of FIG. 6.

To proceed from the closed position, as used for transport, storage and disposal of the box 10, to the open position, tape 52, used to hold the side extensions 34, 36 together so as to form the top 26, is removed. The side extensions 34 and 36 are unfolded from their horizontal closed position to an upright position. The end extensions 38, 40 are also unfolded to an upright position, the flaps 48 now extending horizontally into the box 10, as seen at FIG. 4. The end extensions 38, 40, in an upright position above the end walls 22, 24, provide a significant addition to the height of the end walls 22, 24 above the layer of cat litter 12. The side extensions 34, 36 are then folded 180-degrees at 54, proximate the middle of each side extension 34, 36, so as to extend inward and downward about the flaps 48. The side extensions 34, 36 in such folded position form an addition to the height of the side walls 18, 20 above the litter 12 comparable to the height of the upright end extensions 38, 40. A double row of perforations 56 may be formed on the inside 58 of each side extension 34, 36 to aid in the formation of the 180-degree fold 54 by utilizing two parallel 90-degree folds 60 spaced approximately 3/8-inch apart. Located proximate the side edges 44 of the end extensions 38, 40 are tabs 62 which are pre-cut in the cardboard 16 about their periphery except for an uncut side 64, preferably vertical, which is located farthest from the side edges 44. This construction allows the tab 62 to be pushed inward from its original position 66, rotating about a vertical axis 68 at side 64, to an inwardly extending position 70. Due to the resilient memory of box materials such as cardboard 16, the inwardly extending tab 62 will have a tendency to return towards its original position 66 within the end extension 38, 40. Likewise, the 180-degree longitudinal fold 54 of side extensions 34 and 36 will have a natural tendency to unfold. Thus, in assembling the box 10 for use, with the side extensions 34, 36 folded at 54 over the flaps 48 and held vertically downward to become adjacent to themselves, as seen in FIG. 8, the four tabs 62 are then pressed to an inwardly extending position 70. When the side extensions 34, 36 are subsequently released, the side extensions 34, 36 will attempt to unfold and thus press against the tabs 62 at 72, as seen in FIG. 9, attempting to further open the tabs 62. Thus the resiliency of the inwardly extending tabs 62 will oppose the resiliency of the folded side extensions 34, 36, resulting in the side extensions 34, 36 being restrained in their downward folded position. The end extensions 38, 40 are concurrently locked into their upstanding position by the embrasure of the side extensions 34, 36 about the end flaps 48 of the end extensions 38, 40. The interconnection of the side extensions 34, 36 and end extensions 38, 40 establishes a continuous rigid wall about the box 10, retaining the open configuration of the box 10 for use.

When the box 10 has been used and it is desired to dispose of the box 10 and its contents, essentially the reverse proceedure is completed. By pressing the side extensions 34, 36 together about fold 54, the tabs 62 are easily returned to their original positions 66 within the end extensions 38, 40. The side extensions 34, 36 then are unfolded and straightened out, thereby releasing the end extensions 38, 40 to be refolded to their original horizontal closed position 46. The side extensions 34, 36 then are refolded at 32 to lay across the box 10 and resume the form of top 26, which may be, if desired, resecured for disposal.

FIG. 10 illustrates the pattern of a single flat sheet 30 of cardboard 16 which has been cut in a shape to form the disposable cat litter box 10, the dashed lines indicating fold lines.

It is thought that the disposable cat litter box 10 of the present invention and its many attendant advantages will be understood from the foregoing description and that it will be apparent that various changes in form, construction and arrangement of the parts thereof may be made without departing from the spirit and scope of the invention or sacrificing all of its material advantages, the form hereinbefore described being merely an exemplary embodiment thereof.

I claim:
1. A disposable cat litter box, comprising:
   a. a rectangular base having opposing side edges and end edges;
   b. a pair of opposing sides extending upwards from said side edges of said rectangular base; a pair of opposing ends extending upwards from said end edges of said rectangular base; said sides and ends being joined to form a box; each side and end having a top edge;
   c. a pair of opposing side extensions continuing from said top edges of said sides, which, when the box is in a closed position, are folded at said top edges of said sides so as to form a top to said closed box; and, when the box is in an open position, extend upwardly to an approximate transverse midline, whereat each side extension is folded approximately 180-degrees inward and downward;
   d. a pair of opposing end extensions continuing from said top edges of said ends, each end extension having opposing side edges from which a pair of flaps extend; said opposing end extensions, when the box is in a closed position, folding inwardly at said top edges of said ends so as to lie beneath the top of the closed box; and, when the box is in an open position, extending upwardly with the flaps extending orthogonally inward;
   e. said opposing end extensions additionally having a tab formed therein proximate each of the opposing side edges of the end extensions; said tabs being formed within said end extensions so as to rotate inward; wherein, when the box is in a closed position, said tabs remain flush with the end extensions; and, when the box is in an open position, with the side extensions extending upwardly from the sides, the end extensions extending upwardly from the ends with said flaps extending inwardly, and the side extensions being folded approximately 180-degrees over said flaps so as to embrace said flaps therein, said tabs, when rotated inward, resiliently engage and restrain said folded side extensions from unfolding;

f. said folded side extensions enclosing said end extension flaps to maintain said end extensions in an upright position and said side extensions being held in an upright folded position by said end extension flaps and said inwardly rotated tabs, so as to form a disposable cat litter box with a sturdy extended wall about its perimeter.

2. The disposable cat litter box, as recited in claim 1, wherein the opposing sides and opposing ends are slanted so as to extend upwards and outwards from said side edges and end edges of said rectangular base.

3. The disposable cat litter box, as recited in claim 1, wherein said tabs have a periphery which is pre-cut except for an uncut side the uncut side of said tab forming an axis of rotation for said tab.

4. The disposable cat litter box, as recited in claim 3, wherein said uncut side of said tab generally is more distant than said pre cut periphery of said tab from said side edge of said end extension.

5. The disposable cat litter box, as recited in claim 1, wherein the inward rotation of each tab formed within the end extensions is about a vertical axis.

6. The disposable cat litter box as recited in claim 1, wherein said 180-degree inward fold of said side extensions in the open position of the box is formed by two adjacent 90-degree folds.

7. A disposable cat litter box, comprising:

a. a rectangular base having opposing side edges and end edges;

b. a pair of opposing sides extending upwards from said side edges of said rectangular base; a pair of opposing ends extending upwards from said end edges of said rectangular base; said sides and ends being joined to form a box; each side and end having a top edge;

c. a pair of opposing side extensions continuing from said top edges of said sides, which, when the box is in a closed position, are folded at said top edges of said sides so as to form a top to said closed box; and, when the box is in an open position, extend upwardly to an approximate transverse midline, whereat each side extension is folded approximately 180-degrees inward and downward;

d. a pair of opposing end extensions continuing from said top edges of said ends, each end extension having opposing side edges from which a pair of flaps extend; said opposing end extensions, when the box is in a closed position, folding inwardly at said top edges of said ends so as to lie beneath the top of the closed box; and, when the box is in an open position, extending upwardly with the flaps extending orthogonally inward;

e. said opposing end extensions additionally having a tab formed therein proximate each of the opposing side edges of the end extensions; each said tab having a periphery which is pre-cut except for an uncut side, which uncut side is generally more distant than said pre-cut periphery from said side edges of said end extensions, said uncut edge forming an axis of rotation for each said tab; said tabs being formed within said end extensions so as to rotate inward about said axes of rotation; wherein, when the box is in a closed position, said tabs remain flush with the end extensions; and, when the box is in an open position, with the side extensions extending upwardly from the sides, the end extensions extending upwardly from the ends with said flaps extending inwardly, and the side extensions being folded approximately 180-degrees over said flaps so as to embrace said flaps therein, said tabs, when rotated inward, resiliently engage and restrain said folded side extensions from unfolding;

f. said folded side extensions enclosing said end extension flaps to maintain said end extensions in an upright position and said side extensions being held in an upright folded position by said end extension flaps and said inwardly rotated tabs, so as to form a disposable cat litter box with a sturdy extended wall about its perimeter.

* * * * *